Nov. 27, 1928.
J. E. HALE
1,693,576
CAR WHEEL
Filed June 20, 1927
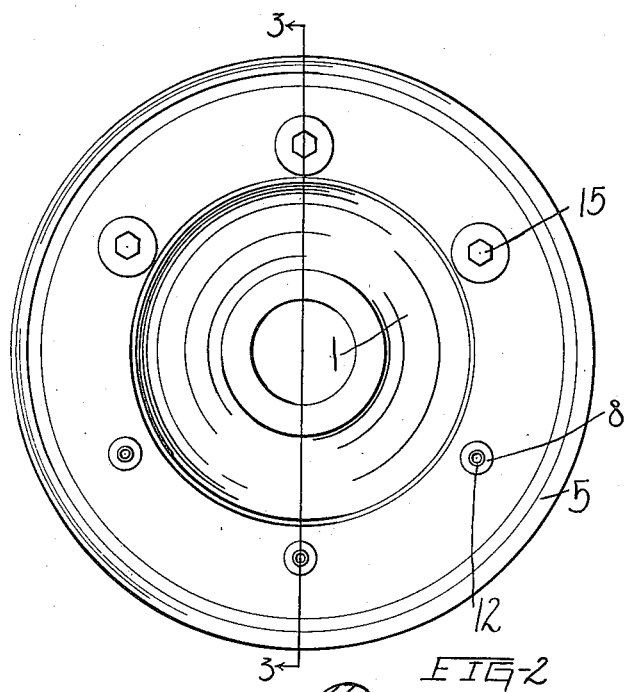
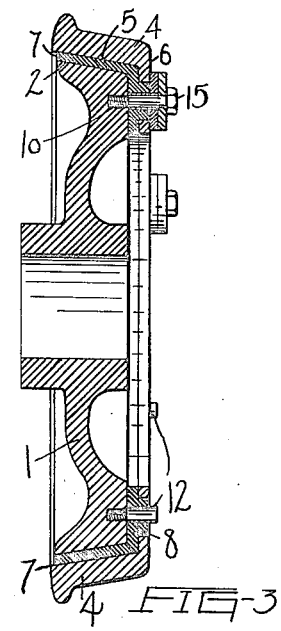
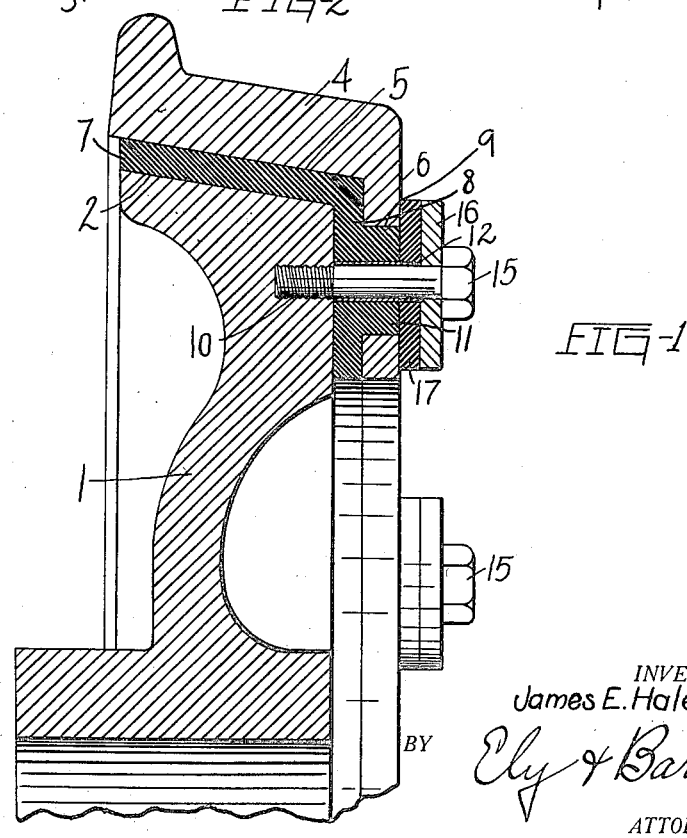
INVENTOR.
James E. Hale
BY Ely & Barrow
ATTORNEYS.

Patented Nov. 27, 1928.

1,693,576

UNITED STATES PATENT OFFICE.

JAMES E. HALE, OF SUMMIT COUNTY, OHIO, ASSIGNOR TO THE FIRESTONE TIRE AND RUBBER COMPANY, OF AKRON, OHIO, A CORPORATION OF OHIO.

CAR WHEEL.

Application filed June 20, 1927. Serial No. 200,037.

This invention relates to the construction of car wheels such as used on railroads and railways, the object of the invention being to interpose between the outer steel tire and the wheel body, a cushioning layer or band of rubber which will deaden and absorb the shocks incident to use. The beneficial results to be derived from the invention are easier riding and lessening of the noise incident to the operation of the cars.

The invention resides in the particular manner of incorporating the cushioning element in the car wheel so that all metal to metal contacts are avoided. The cushioning element and the details of construction will be understood from the description and drawings contained herein, which, however, are not to be understood as limiting the invention to exact details, the scope of the invention being set forth in the appended claim.

In the drawings:

Figure 1 is a radial section through a car wheel embodying the elements of the invention;

Figure 2 is a side elevation; and

Figure 3 is a cross-section on the line 3—3 of Figure 2.

The car wheel body, which is usually of cast metal and may be of any suitable type or form, is shown by the numeral 1, being provided with a conical or tapered outer periphery 2. The flanged metal tire is indicated at 4, being provided with an under surface 5 substantially parallel to the surface 3 and with a depending flange 6.

The cushioning element is shown at 7, being a ring or conical sleeve of rubber lying between the surfaces 2 and 4 and being held under compression between the said surfaces. The ring of rubber is provided with a flange 8 which projects between the body of the wheel and the flange on the tire. The flange about the tire is provided with a number of openings 9 which are in alignment with a similar number of bolt sockets 10 about the wheel. Projecting from the flange 8 are a number of integral, circular bosses 11 which fit tightly within the holes 9. Metal sleeves or tubes 12 are located within the cushioning ring in alignment with the sockets 10 and bolts 15 are passed through the sleeves and into the sockets. Metal washers 16 are placed beneath the heads of the bolts and rubber washers 17 between the washers 16 and the side of the flange 6, the tubes 12 projecting into the washers.

When the wheel and tire are assembled, it will be apparent that a tight fitting mounting is provided for the tire and yet all metal to metal contacts between the wheel body and the tire are avoided. In this manner the greatest cushioning properties are obtained, and wear and disintegration of the parts are avoided. The structure is easily assembled and disassembled and parts may be readily replaced if worn.

What is claimed is:

A car wheel comprising a wheel body having a tapered outer periphery, a tire adapted to fit about the body and having a tapered inner periphery, a layer of rubber under compression located between the outer periphery of the wheel and the inner periphery of the tire about their adjacent surfaces, and securing means to hold the elements together, said securing means being seated in one of the elements but maintained out of contact with the other element by a cushioning medium.

JAMES E. HALE.